(12) United States Patent
Bornemann et al.

(10) Patent No.: US 9,777,443 B2
(45) Date of Patent: Oct. 3, 2017

(54) SELF-PROPELLING ROAD CONSTRUCTION MACHINE, PARTICULARLY ROAD ROLLER, AND METHOD FOR DRIVING A ROAD CONSTRUCTION MACHINE

(71) Applicant: Hamm AG, Tirschenreuth (DE)

(72) Inventors: Detlef Bornemann, Leonberg (DE); Axel Roemer, Tirschenreuth (DE); Gerhard Mahler, Windischeschenbach (DE); Andreas Baumann, Schwandorf (DE)

(73) Assignee: Hamm AG, Tirschenreuth (DE)

( * ) Notice: Subject to any disclaimer, the term of this patent is extended or adjusted under 35 U.S.C. 154(b) by 0 days.

(21) Appl. No.: 14/601,379

(22) Filed: Jan. 21, 2015

(65) Prior Publication Data

US 2015/0204029 A1    Jul. 23, 2015

(30) Foreign Application Priority Data

Jan. 23, 2014   (DE) .................. 10 2014 201 240

(51) Int. Cl.
*E01C 23/07*   (2006.01)
*E01C 19/22*   (2006.01)
(Continued)

(52) U.S. Cl.
CPC ............ *E01C 19/22* (2013.01); *B60N 2/14* (2013.01); *E01C 19/26* (2013.01); *E01C 2301/30* (2013.01)

(58) Field of Classification Search
CPC ..... G05D 1/00; G05D 2201/0213; B60N 2/14
(Continued)

(56) References Cited

U.S. PATENT DOCUMENTS

| 8,019,515 | B2 * | 9/2011 | Okeson | E02F 3/7609 254/323 |
|---|---|---|---|---|
| 2005/0254898 | A1 * | 11/2005 | Mochigi | E01C 19/23 404/128 |

(Continued)

FOREIGN PATENT DOCUMENTS

| CN | 1126291 A | 7/1996 |
|---|---|---|
| CN | 1714205 A | 12/2005 |

(Continued)

OTHER PUBLICATIONS

Chinese Search Report dated Jul. 20, 2016, in connection with corresponding CN Application No. 2015100358355 (2 pgs.).

*Primary Examiner* — Thomas B Will
*Assistant Examiner* — Katherine Chu
(74) *Attorney, Agent, or Firm* — Maier & Maier, PLLC

(57) ABSTRACT

In a self-propelling road construction machine, particularly a road roller (1), comprising a travel drive, a steering device, a control device (30) for the travel drive and the steering device, and a driver's seat (5) rotatable by at least 180° and including an integrated operating element (8) for the vehicle speed, with the operating element (8) generating the control signals for the travel drive in dependence on the direction of the control movement of the operating element (8) or the direction of force application on the operating element (8), it is provided that, in response to a first switching command, the control device (30) will automatically perform a reversing process comprising deceleration, seat rotation, change of direction of travel, and acceleration to the set vehicle speed in opposite direction to the original direction of travel.

15 Claims, 2 Drawing Sheets

(51) Int. Cl.
*B60N 2/14* (2006.01)
*E01C 19/26* (2006.01)

(58) Field of Classification Search
USPC .................. 701/36, 48, 49, 50; 404/84.1
See application file for complete search history.

(56) References Cited

U.S. PATENT DOCUMENTS

| | | | |
|---|---|---|---|
| 2009/0038282 A1* | 2/2009 | Avalle | A01D 51/002 56/10.8 |
| 2012/0004814 A1* | 1/2012 | Hyodo | F02D 29/00 701/50 |
| 2012/0095655 A1* | 4/2012 | Hyodo | B60W 10/06 701/50 |
| 2014/0064897 A1* | 3/2014 | Montgomery | E02F 3/434 414/685 |
| 2014/0095009 A1* | 4/2014 | Oshima | G05D 1/0238 701/23 |
| 2014/0236412 A1* | 8/2014 | Sung | B62D 15/0285 701/23 |
| 2015/0149017 A1* | 5/2015 | Attard | B60W 30/182 701/23 |

FOREIGN PATENT DOCUMENTS

| | | | | |
|---|---|---|---|---|
| CN | 102211536 A | 10/2011 | | |
| DE | WO 2004059088 A1 * | 7/2004 | ............... | B60N 2/14 |
| EP | 0693590 B1 | 10/1998 | | |
| EP | 1 573 134 A | 9/2005 | | |

\* cited by examiner

SELF-PROPELLING ROAD CONSTRUCTION MACHINE, PARTICULARLY ROAD ROLLER, AND METHOD FOR DRIVING A ROAD CONSTRUCTION MACHINE

BACKGROUND OF THE INVENTION

Field of the Invention

The present invention relates to a self-propelling road construction machine, particularly a road roller, according to the precharacterizing part of claim 1, and a method for driving a road construction machine according to the precharacterizing part of claim 8.

Description of the Prior Art

A generic road construction machine is known from EP 1 573 134 A. The road roller will work e.g. behind a paver which used for the installing and pre-compacting of asphalt material. The road roller will several times run over the surfaces installed by the paver, so as to establish the final compaction and the planarity of the surface. In the process, the direction of travel will be changed several times. The portions of forward and rearward runs are normally approximately identical. To ensure safe operation of the road roller, it is required that, for the essential operating elements such as e.g. the driving direction control element (steering wheel, joystick) and the travel lever for speed selection, there exists a clear assignment to the direction of travel that is evident to the user.

From EP 1 573 134 A, it is also known to integrate the operating element for vehicle speed and steering into a rotatable driver's seat, wherein, in each rotary position of the seat, the set moving direction of the operating element will coincide with the direction of travel of the road construction machine.

It is an object of the invention, in a self-propelling road construction machine, particularly a road roller, and in a method for driving a road construction machine, to further improve the possibilities of control and thereby to increase the operational safety.

The above object is achieved by the features defined in claim 1 and in claim 8.

SUMMARY OF THE INVENTION

The invention provides in an advantageous manner that the control device, in response to a first switching command, will automatically perform a reversing process with deceleration, seat rotation, change of the direction of travel and acceleration to the set vehicle speed in the opposite direction to the original direction of travel.

This has the advantage that it is not necessary anymore for the driver to manually coordinate the seat rotation and, during the seat rotation, the travel speed of the road construction machine, but that the seat rotation can be performed by a push of a button and is performed automatically while, at the same time, the control of the travel speed is coordinated automatically until the vehicle speed in the opposite direction has been reached. Thereby, when the direction is to be reversed, the vehicle operator is allowed to concentrate e.g. on the steering, thus improving not only the possibilities of control but also the operational safety because the driver does not need anymore to concentrate on a coordination of the seat rotation and the vehicle speed at the same time.

Preferably, it is provided that the operating element is integrated into a rotatable driver's seat.

It can be provided that, in an angular range of the seat rotation from 80° to 100°, preferably 85° to 95°, relative to the original direction of travel, the control device will reduce the vehicle speed until standstill has been reached.

Particularly, it can be provided that, upon initiation of the reversing process, up to a seat rotation of 90° relative to the original direction of travel, the control device will automatically, preferably continuously reduce the preselected vehicle speed to zero and then, with further seat rotation up to 180°, will set the vehicle speed again to the originally preselected vehicle speed in the opposite direction. In the automatically performed reversing process resulting from the switching command, the seat will start rotating while the road roller is getting slower. When the seat is passing through the 90° position relative to the original direction of travel, the travel speed is reduced to zero for reversal of the direction of travel and then will be increased again to the originally preselected travel speed. In the process, the standstill of the machine will occur at the 90° position of the seat or at least near the 90° position. When the seat is rotated into the new direction of travel, the operating element is switched to the new direction of travel.

Preferably, it is provided that, in case of a change of the position of the operating element or an application of force to the operating element during the reversing process, the control device will trigger a standstill of the machine and/or stoppage of the seat rotation.

Further, it can be provided that the control device, if the driver's seat at initiation of the reversing process has been set to a seat rotary position deviating from the initial positions of 0° and respectively 180°, will first transfer the seat rotary position into an initial position or will transfer the seat rotary position of the driver's seat, via the shortest path, to a desired seat rotary position.

When a desired travel speed of the road roller has been reached, the control device, in response to a second switching command, can transition to automatic operation in which the current control signals for the travel drive will be automatically held constant.

The driver, by way of his/her application of force on the operating element, e.g. a control lever designed in the manner of a joystick, can effect an acceleration or deceleration, wherein the direction and level of the force will be evaluated in relation to the direction of travel. When the desired speed has been reached, the driver will confirm this via a pushbutton. The machine will now run at a constant speed until an acceleration or deceleration will be initiated by application of a force on the operating element.

Preferably, it is provided that the control device will switch from automatic operation to manual operation when the level of the detected force acting on the operating element exceeds a predetermined force threshold value in a predetermined angular range of the operating lever actuation.

In case of a preselected travel speed above a predetermined speed threshold value, it can be provided that, first, a deceleration to a speed value below the speed threshold value will be initiated, then, the reversing process will be performed and, after completion of the reversing process, an acceleration will be performed again to the originally preselected travel speed beyond the speed threshold value.

It can also be provided that, at least in manual operation of the control device, sensors will detect the level and the direction of the force applied on the operating element, and that the control device, in dependence on the detected angle relative to the direction of travel and on the level of the force, will generate a control signal for acceleration, deceleration or emergency stoppage.

This has the advantage that, in manual operation, the acceleration can be controlled through application of force by the vehicle operator. This allows for a more sensitive control. Depending on the level of the force, it can be detected whether a high or low acceleration or a low deceleration, a high deceleration or even an emergency stoppage is desired.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which.

DETAILED DESCRIPTION OF PREFERRED EMBODIMENTS

Figure 1:
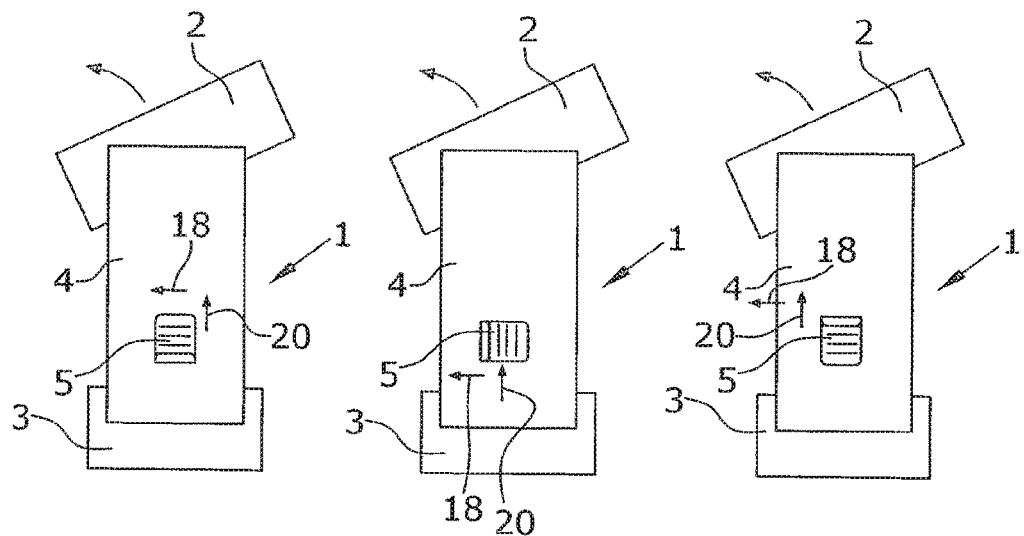
FIG. 1 illustrates the effects of the actuation of the operating element.
Figure 3:
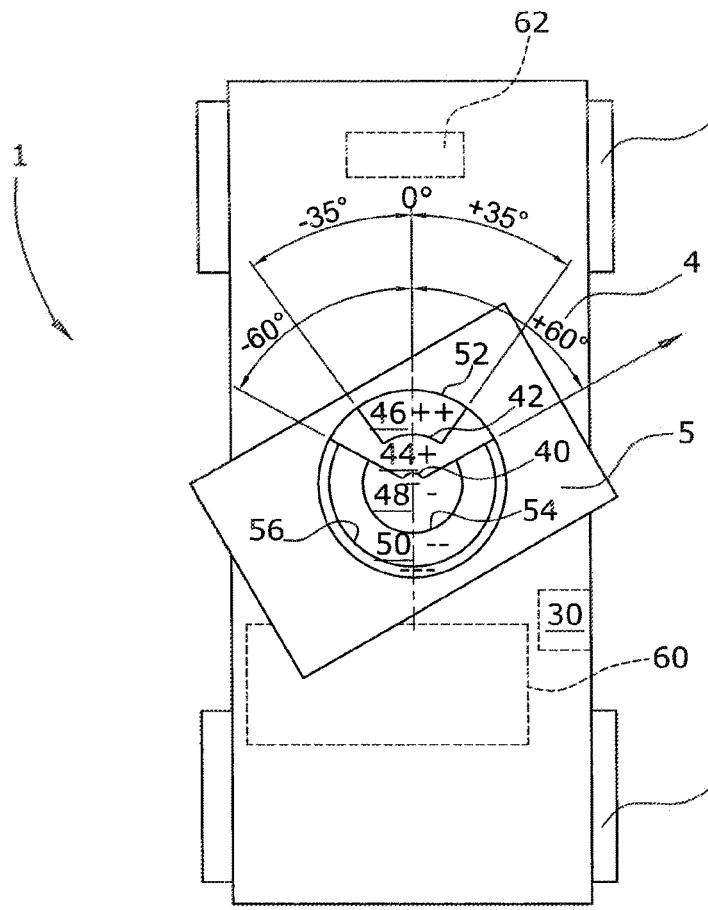
FIG. 3 is a schematic representation of a road construction machine according to the invention comprising an operating element.

In FIGS. 1 and 3, there is schematically illustrated a road roller 1 comprising two roller drums 2,3, at least one of them being steerable. The roller drums 2,3 are coupled to each other by a chassis 4 on which a driver's cab for an operating person is arranged.

Arranged in said driver's cab is a rotatable driver's seat 5 comprising an integrated operating unit 8 for driving operation. Said operating unit 8 preferably comprises an operating lever whose function will be explained in detail in connection with FIG. 2.

In manual operation, the driver will accelerate and resp. decelerate the travel speed preferably by application of force on the operating element 8. When the desired travel speed has been reached, the driver can confirm this via a pushbutton. The road roller will then travel at a constant speed until, by application of force on the operating element 8, an acceleration or deceleration will be triggered.

Figure 2:
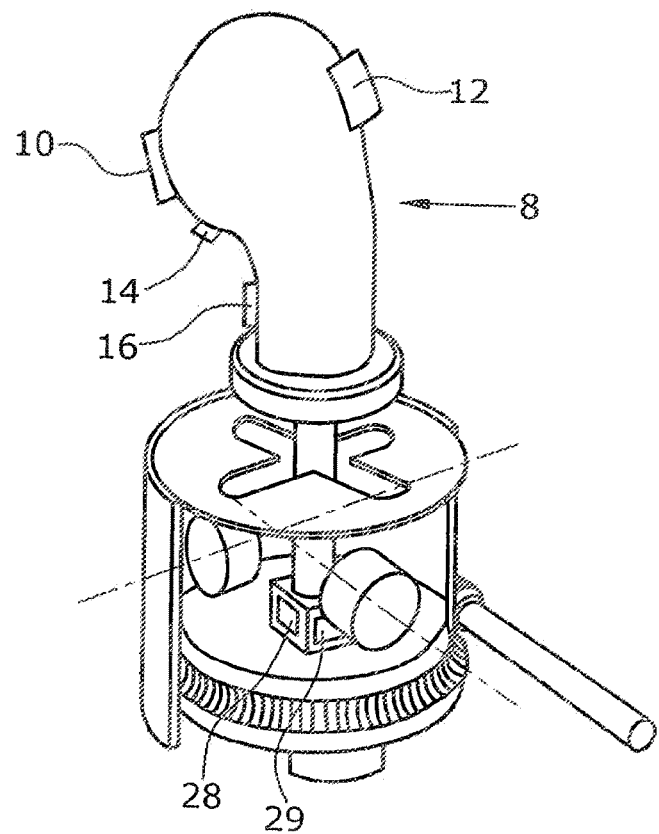
FIG. 2 is a view of the operating element.

FIG. 2 illustrates the operating element 8 with its constructional components and its operating functions. The operating element 8 comprises switching means 10 for initiating a reversing process both in manual and in automatic travel operation, switching means 12 for rear-wheel steering and respectively crab steering, switching means 14 for switch-on and switch-off of vibration, and switching means 16 for unlocking the immobilizer. It is self-evident that the mentioned operating functions do not necessarily have to be arranged on operating element 8 but can also be arranged within reach of the driver, e.g. on the seat.

Figure 4:
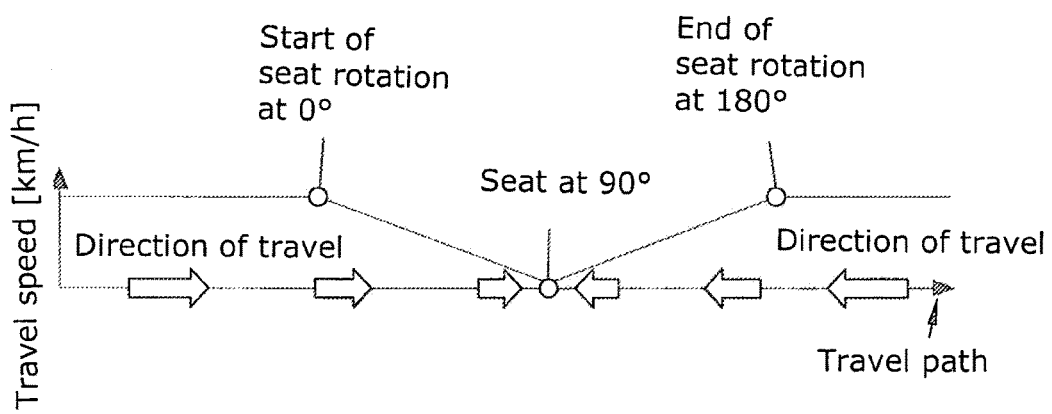
FIG. 4 is a schematic representation of a reversing process.

FIG. 4 illustrates the reversing process which can be actuated with the aid of a switching device 10. The schematic diagram-like representation shows the level of the speed and the direction of travel in dependence on the seat position. When adjusted to the original direction of travel, the driver's seat 5 shall be in a seat rotary angle of 0°. During the reversing process, the driver's seat will move from this 0° position and respectively from its present state beyond a seat position of 90°, i.e. transversely relative to the original direction of travel, into a seat rotary position of 180° extending in the direction opposite to the original direction of travel. As soon as the reversing process is initiated by actuation of switching device 10, the rotation of the seat will start, e.g. at 10°, while at the same time the travel speed is being reduced, preferably continuously, until a seat rotary position of about 90° has been reached. In case that, at initiation of the reversing process, the travel speed should happen to be above a predetermined speed threshold value, the road roller will first be decelerated to a speed below the speed threshold value and the seat rotation will be initiated only thereafter with a further deceleration. In the seat rotary position of about 90°, the travel speed has to be reduced to zero for switching to the opposite direction and, subsequently, during further rotation of the seat, it will increase again to the speed threshold value which will be reached at the latest at a seat rotary position of 180° relative to the original direction of travel. Thereafter, the road roller can be accelerated again to a predetermined travel speed. It is self-evident that the reversal of the direction of travel does not necessarily have to be performed in a seat rotary position of exactly 90° but can also be performed e.g. in an angular range of 80-100°, preferably 80-95°. Further, it could also be provided that the respective travel speeds can be preselected to be different in the forward and respectively rearward directions.

Possible initial states of the operating element 8 at initiation of the reversing process are either a neutral position of operating element 8 or a deflected position of operating element 8 with respect to the travel speed.

The driver's seat 5 can be arranged in the direction of travel (seat rotary position of 0°) or in a rotated position relative to the direction of travel.

At initiation of the seat rotation, the driver's seat 5 can have a seat rotary position deliberately preselected by the driver. If the driver's seat 5 is not arranged in the middle position, it is possible that, at initiation of the reversing process, there is first performed an automatic rotation of the seat to the 0° position. There can also occur the case that the operating person has laterally shifted the seat from a middle position. If the reversing process is initiated in such a position, the seat will first be transferred into the middle position, and then the reversing process will be initiated.

During the reversing process in the state of automatic operation, the machine will control the travel speed automatically as long as the operating element 8 is not actuated. When, after initiation of the reversing process, the operating element 8 is actuated, the reversing process will be discontinued so that, for resuming the reversing process, the switching device 10 has to be actuated again.

Depending on the initial rotary position of the seat, the control can choose the shortest way for rotation of the seat.

Evaluation of the control force exerted on operating element 8 is performed in two dimensions with the aid of force sensors 28, 29 as shown in an exemplary manner in FIG. 2.

The two-dimensional evaluation of the control force makes it possible to detect the level and the direction of the force applied on the operating element 8, wherein the control device 30 will generate a control signal for acceleration, deceleration or an emergency stop in dependence on the detected angle relative to the direction of travel and on the level of the force.

The direction of the force will always be evaluated in parallel to the direction of travel. Also with a rotatable driver's seat, it is possible to always evaluate the direction of the force in parallel to the direction of travel. For this purpose, there is merely required angular information with respect to the seat rotary position relative the steering axis of the vehicle.

In FIG. 3, it is schematically illustrated in which manner the detected force is evaluated in the direction of travel. The schematic illustration in FIG. 3 represents the angle- and force-dependent evaluation of the force exerted on the operating element 8. When viewed in the forward direction, there are first provided e.g. two force threshold values 40, 42 which, when exceeded, will first entail a small acceleration in a first angular range 44 and then a higher acceleration in an angular range 46 which preferably is narrower than the first angular range 44. The small acceleration is marked by a "+" in the angular range 44 and the high is marked by a "++" in the angular range 46. It is self-evident that the angular ranges can also have the same size.

Said angular ranges are angularly limited wherein, preferably, for the angular range 44, a larger angular segment can be set for evaluation of the control force than for the second angular range 46. The second angular range 46 for high acceleration can substantially comprise an angular range smaller than ±45° relative to the direction of travel, preferably ±35°, thus covering a total angular range of 50° to 80°.

The angular range 44 for smaller acceleration comprises a total angular range of preferably more than 90°, e.g. 80° to 150°.

When the control force is exerted in a direction which is outside the set force threshold value 40 in the narrower angular range 46, change to a higher acceleration will be performed.

If the evaluation of the force exerted on operating element 8 has the result that this force falls below the first force threshold value 40, a small deceleration will be set. In FIG. 1, the field with the small deceleration in the entire angular range 44, 48 is marked by "−".

In the remaining angular range 48 outside the first angular range 44, a small deceleration is set as long as a third force threshold value 54 is not exceeded. When this value is exceeded, a large deceleration "−−" will be set.

The force threshold values 42 and 54 can have the same amounts.

In case that, in the remaining angular range 48 outside the first angular range 44, there is exceeded a fourth force threshold value 58, an emergency stop "−−−" will be triggered.

In automatic operation, it can provided that, in the first angular range 44, that forces acting on operating element 8 which are above a set force threshold value 52 will have the effect of a forced switchover from automatic operation to manual operation.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A self-propelling road construction machine, particularly a road roller, comprising
    a travel drive,
    a steering device,
    a control device for the travel drive and the steering device, and
    a driver's seat rotatable by at least 180° and including an integrated operating element for the vehicle speed,
    the operating element generating the control signals for the travel drive to achieve a vehicle speed to be set in dependence on the direction of the control movement of the operating element or the direction of force application on the operating element,
    wherein the control device is operative, in response to a first switching command, to automatically perform a reversing process comprising, in order, a deceleration of the road construction machine, a seat rotation of the driver's seat during the deceleration, a change of direction of travel of the road construction machine, and an acceleration of the road construction machine to the set vehicle speed in an opposite direction to the original direction of travel.

2. The device according to claim 1, wherein during the seat rotation of the driver's seat during the deceleration, in an angular range of the seat rotation from 80° to 100°, preferably from 85° to 95° relative to the original direction of travel, the control device is operative to reduce the vehicle speed to a small value r until standstill has been reached.

3. The device according to claim 1, wherein, in further response to the first switching command, the control device is operative, as the seat rotates between an angular range of 0° to 90° relative to the original direction of travel, to automatically and preferably continuously reduce the set vehicle speed to zero and then, as the seat rotates between an angular range of 90° to 180° relative to the original direction of travel, to set the vehicle speed again to the set vehicle speed in the opposite direction.

4. The device according to claim 1, wherein, in case of a change of the position of the operating element or an application of force to the operating element during the reversing process, the control device is operative to trigger a standstill of the machine and/or stoppage of the seat rotation.

5. The device according to claim 1, wherein the control device, if the driver's seat at initiation of the first switching command has been set to a seat rotary position deviating from the initial positions of 0° and respectively 180°, is operative to first transfer the seat rotary position of the driver's seat into an initial position or to transfer the seat rotary position via the shortest path to a desired seat rotary position.

6. The device according to claim 1, wherein the control device is operative, when a desired travel speed has been reached, to transition, in response to a second switching command, to automatic operation in which the current control signals for the travel drive are automatically held constant.

7. The device according to claim 1, wherein the control device is operative to switch from automatic operation to manual operation when the level of a detected force acting on the operating element exceeds a predetermined force threshold value.

8. A method for driving a road construction machine, particularly a road roller, said road construction machine comprising a driver's seat rotatable by at least 180° and an operating element for travel operation, said operating element being integrated into the driver's seat, wherein the road construction machine travels to a travel operation with a set vehicle speed, and wherein, in response to a first switching command, a reversing process is automatically performed, said reversing process comprising, in order, a deceleration of the road construction machine, a seat rotation of the driver's seat during the deceleration, a change of direction of travel of the road construction machine, and an acceleration of the road construction machine to the set vehicle speed in opposite direction to the original direction of travel.

9. The method according to claim 8, wherein during the seat rotation of the driver's seat during the deceleration in an angular range of the seat rotation from 80° to 100°, preferably from 85° to 95° relative to the original direction of travel, the vehicle speed is reduced to a value until standstill has been reached.

10. The method according to claim 8, wherein, in further response to the first switching command, as the seat rotates between an angular range of 0° to 90° relative to the direction of travel, the vehicle speed is automatically and preferably continuously reduced to zero and then as the seat rotates between an angular range of 90° and 180° relative to the direction of travel, the vehicle speed is increased to the set vehicle speed in the opposite direction.

11. The method according to claim 8, wherein, in case of a preselected travel speed above a predetermined speed threshold value, there is first initiated a deceleration to a speed value below the speed threshold value, then the reversing process is performed and, after completion of the reversing process, an acceleration is performed again to the originally preselected travel speed beyond the speed threshold value.

12. The method according to claim 8, wherein, in case of a change of the position or in case of actuation of the operating element during the reversing process, a standstill of the machine and/or stoppage of the seat rotation is triggered.

13. The method according to claim 8, wherein, if at initiation of the first switching command a current seat position has been set which deviates from the initial position of 0° and respectively 180°, the seat position is first transferred into the initial position associated to the direction of travel, or the driver's seat is transferred from the current seat position via the shortest path to a desired seat rotary position before the reversing process is initiated.

14. The method according to claim 8, wherein, when a desired travel speed has been reached, automatic operation is initiated in response to a second switching command, and, in said automatic operation, the current control signals for the travel drive are automatically held constant.

15. The method according to claim 14, wherein said automatic operation is automatically switched to manual operation when the level of the detected force acting on the operating element exceeds a predetermined threshold value.

\* \* \* \* \*